(12) United States Patent
Cantrill

(10) Patent No.: US 7,389,494 B1
(45) Date of Patent: Jun. 17, 2008

(54) MECHANISM FOR STATICALLY DEFINED TRACE POINTS WITH MINIMAL DISABLED PROBE EFFECT

(75) Inventor: Bryan M. Cantrill, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 756 days.

(21) Appl. No.: 10/713,405

(22) Filed: Nov. 14, 2003

(51) Int. Cl.
*G06F 9/44* (2006.01)
(52) U.S. Cl. .................... 717/125; 717/128; 717/130
(58) Field of Classification Search ........ 717/124–136, 717/158
See application file for complete search history.

(56) References Cited

OTHER PUBLICATIONS

Tamches, "Fine-Grained Dynamic Instrumentation of Commodity Operating System Kernels", University of Wisconsin, pp. 1-141, 2001.*
Uhlig et al., "Trace-Driven Memory Simulation: A Survey", ACM, pp. 128-169, Jun. 1997.*
Tamches, Ariel and Miller, Barton P; Fine-Grained Dynamic Instrumentation of Commodity Operating System Kernels; [Online]; http://www.usenix.org/publications/library/proceedings/osdi99/full_papers/tamches/tamches.pdf, Published Feb. 1999.
Murayama, John; "Performance Profiling Using TNF"; [Online]; http://developers.sun.com/solaris/articles/tnf.html, Jul. 2001.
Lorch, Jacob R. and Smith, Alan J.; "The Vtrace Tool: Building a system Tracer for Windows NT and Windows 2000"; [Online] http://msdn.microscoft.com/msdnmag/issues/1000/Vtrace/default.aspx, Oct. 2000.
"Chapter 10. The Generalized Trace Facility (GTF)"; [Online]; http://publib.boulder.ibm.com/cgi-bin/bookmgr/BOOKS/IEA2V100/CCONTENTS, Jan. 2001.
Mirgorodskii, Alex; "The Path to Portable Kernel Instrumentation: The Kerninst API"; http://www.dyninst.org/mtg2003/slides/KerninstAPI.pdf, Apr. 2003.
Richard Moore, et al.; "IBM Dynamic Probes"; http://www-124.ibm.com/developerworks/opensource/linux/projects/dprobes/README, 2000.
K. Yaghmour et al.; "Measuring and Characterizing System Behavior Using Kernel-Level Event Logging"; Proceedings of the 2000 USENIX Annual Technical Conference; Jun. 18-23, 2000, San Diego, California, USA.

* cited by examiner

*Primary Examiner*—Ted T. Vo
(74) *Attorney, Agent, or Firm*—Osha Liang LLP

(57) ABSTRACT

A method of defining a trace point, including defining a trace point representation in a program source code, compiling the program source code to generate an instrumented program comprising the trace point corresponding to the trace point representation, and associating the trace point with a placeholder function configured to produce a minimal disabled probe effect.

38 Claims, 6 Drawing Sheets

MECHANISM FOR STATICALLY DEFINED TRACE POINTS WITH MINIMAL DISABLED PROBE EFFECT

BACKGROUND

Analyzing the dynamic behavior and performance of a complex software system is a difficult task. Typically, a software system is analyzed by gathering data about the system at each system call and post-analyzing such data using a post-processing utility. One example of a conventional means for performing software analysis is a tracing framework.

In a typical architecture of a tracing framework, system calls (or trace points) are defined by a user in the software system's source code. In a tracing framework that allows for statically defined trace points, a call to a particular probe, which may be used to provide a desired type of analysis info, is inserted at each trace point. Generally, the syntax of this call is based on a code, where the code is defined using a variant of the Code Sample 1 below.

Code Sample 1

```
#define TRACE (name)
    if (__tracing_enabled)
        _tracing_function(#name)
```

Code Sample 1 shows a TRACE function passing the parameter name, which identifies a name of a desired probe (e.g., the probe to be enabled). The conditional statement _tracing_enabled identifies whether tracing analysis is currently enabled for the probe identified as name. The function _tracing_function identifies a call to a particular probe identified as name. In essence, when tracing analysis is enabled, the code shown in Code Sample 1 initiates a call at each trace point so tracing may be executed by the identified probe on the relevant code.

Consequently, during compilation of the code shown in Code Sample 1, several instructions may be generated for each trace point even when tracing analysis is disabled. The number of these instructions, which include at least a load instruction, a compare instruction, and a branch, can add up quickly. Overall system performance may be affected by the unwarranted execution of these numerous instructions.

SUMMARY

In general, in one aspect, an embodiment of the invention relates to a method of defining a trace point, comprising defining a trace point representation in a program source code, compiling the program source code to generate an instrumented program comprising the trace point corresponding to the trace point representation, and associating the trace point with a placeholder function configured to produce a minimal disabled probe effect.

In general, in one aspect, an embodiment of the invention relates to a method for enabling a trace point, comprising obtaining a tracing function name from trace object code using a tracing framework, wherein the tracing function name comprises a probe handler, determining an address location of the trace point in an instrumented program by accessing the probe handler in a trace point table, and replacing a placeholder function located at the address location of the trace point with a function call into the tracing framework.

In general, in one aspect, an embodiment of the invention relates to a computer system on a network for defining a trace point comprising a processor, a memory, a storage device, and software instructions stored in the memory for enabling the computer system to define a trace point representation in a program source code, compile the program source code to generate an instrumented program comprising the trace point corresponding to the trace point representation, and wherein the trace point is associated with a placeholder function configured to produce a minimal disabled probe effect.

In general, in one aspect, an embodiment of the invention relates to a computer system on a network for enabling a trace point comprising a processor, a memory, a storage device, and software instructions stored in the memory for enabling the computer system to obtain a tracing function name from trace object code using a tracing framework, wherein the tracing function name comprises a probe handler, determine an address location of the trace point in an instrumented program by accessing the probe handler in a trace point table, and replace a placeholder function located at the address location of the trace point with a function call into the tracing framework.

Other aspects and advantages of the invention will be apparent from the following description and the appended claims.

DETAILED DESCRIPTION

Figure 1:
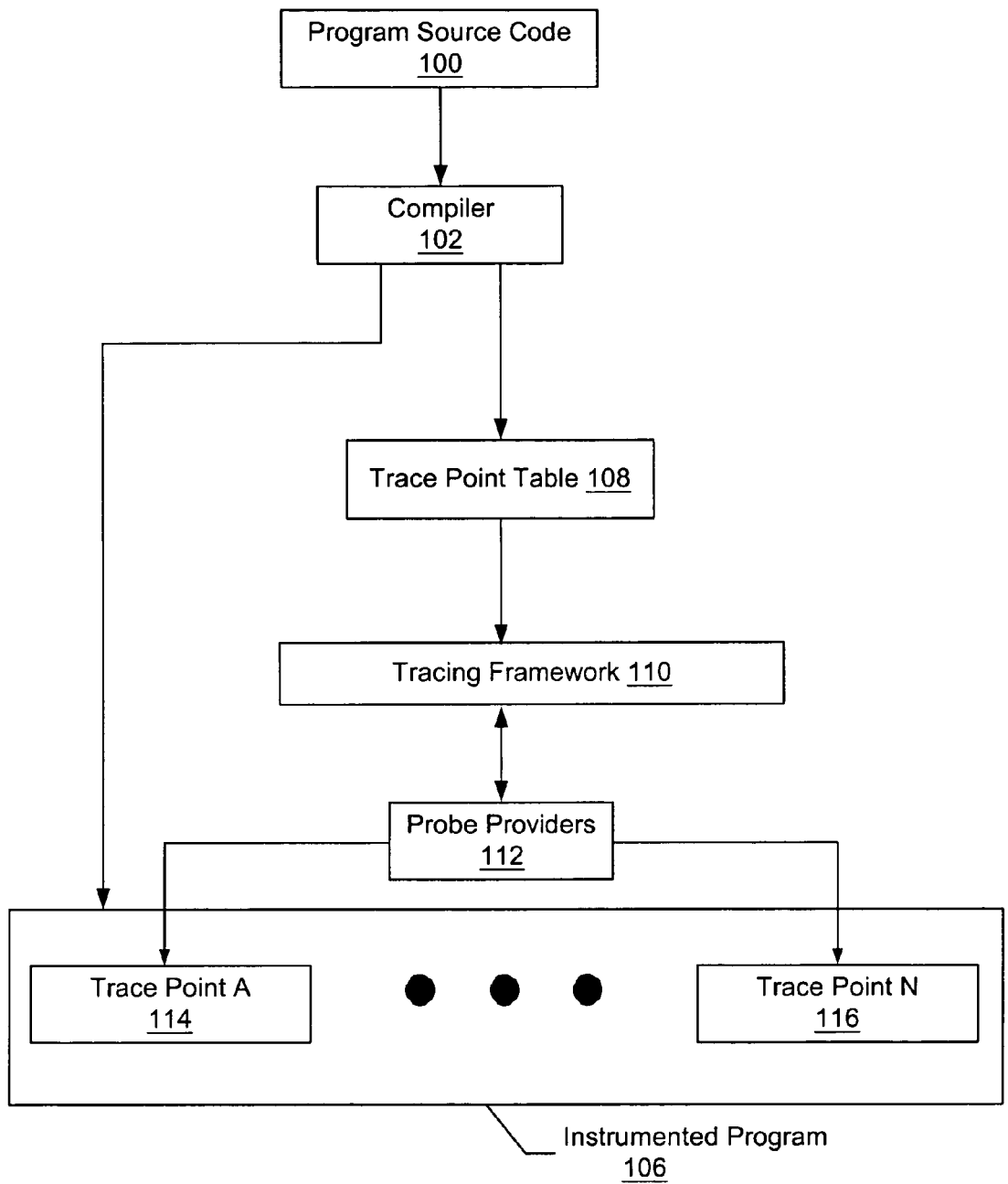
FIG. 1 shows a flow diagram of a system to statically define trace points in an instrumented program in accordance with an embodiment of the invention.

Exemplary embodiments of the invention will be described with reference to the accompanying drawings. Like items in the drawings are shown with the same reference numbers.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Embodiments of the present invention relate to a method and apparatus for statically defining trace points in a tracing framework. Embodiments of the present invention further relate to a method for statically defining trace points with a minimal disabled probe effect. Those skilled in the art will appreciate that the code samples used below to describe the invention are merely included for illustrative purposes and are not intended to limit the scope of the invention.

In order to provide a minimal disabled probe effect (ideally a zero probe effect), a software system may be modified such that, when tracing is not enabled, probe calls at statically defined trace points use minimal system resources. To implement this concept, code may be generally defined using a variant of Code Sample 2 below.

---
Code Sample 2
---
define TRACE(name)\
_tracing_function(#name
---

Using the syntax of Code Sample 2, a call to _tracing_function (#name) at a particular trace point may be dynamically modified such that the call to the tracing function is evaluated using an appropriate probe while tracing is enabled, and, the call to the tracing function uses substantially minimal system resources while tracing is disabled. In some embodiments, while tracing is disabled, the disabled probe effect is achieved by replacing each instruction generated for Code Sample 2 with a placeholder function designed to use minimal system resources when called.

Further, in order to further improve system performance, the above code may be modified to eliminate the call to the name argument (and the associated generation of a load instruction). In an embodiment of the present invention, the modification requires the name of the specific probe to be called to be incorporated into the tracing function itself. Thus, a modified code in accordance with an embodiment of the invention is generally defined as shown in Code Sample 3 below.

---
Code Sample 3
---
define TRACE(name) { \
    extern void _tracing_function_##name (void); \
    _tracing_function_##name( ); \
}
---

Using this syntax, a single instruction is generated from the modified code. This instruction takes the following form:

call _tracing_function[name of probe]

Again, in one embodiment of the invention, this instruction (hereafter referred to as a trace point) may be patched to a placeholder function, such as a no-operation (or a similar operation that produces little or no probe effect), while tracing is disabled. Accordingly, for the modified code, a single placeholder function is required to emulate the trace point. Thus, the disabled probe effect of executing the modified code may be defined as a sum of: (1) the effect of executing the operation (i.e., the no-operation) patched to the placeholder function and (2) the effect on code generation (e.g., changing register allocation, performing memory operations, saving a stack frame, etc.) of treating the cite a function call. Because the effects of both (1) and (2) are acceptably small (and generally negligible), a trace point using the modified code may be considered to have a minimal (or arguably a zero) disabled probe effect.

FIG. 1 shows a flow diagram of a system to statically define trace points in an instrumented program in accordance with one embodiment of the invention. Specifically, in accordance with one embodiment of the invention, FIG. 1 provides an overview of a software system designed to use the modified code shown in Code Sample 3 above. Initially, a program source code (100) is written, obtained, or generated for the software system. In an embodiment of the invention, the program source code (100) is typically developed by numerous people over a lengthy period of time. Often, the program source code (100) is updated to correct errors and/or add new features. Further, in one embodiment of the invention, the program source code (100) may include one or more hard-coded, statically defined trace point representations where each trace point representation includes a tracing function defined using the modified code shown in Code Sample 3.

Once the program source code (100) is written, obtained, or generated, it is subsequently compiled by a compiler (102), to generate an executable program object code in the form of an instrumented program (106). At this stage, the instrumented program includes trace points that are not yet patched to a placeholder function or a trampoline. The instrumented program (106) is subsequently loaded into the kernel (not shown). During the loading process, when a dynamic linker (not shown) (or a related process) encounters a trace point, the dynamic linker patches trace point to placeholder function, such as a no-operation (or equivalent function which produces little or no probe effect). The dynamic linker also creates a trace point table (108) (i.e., relocation table) which is populated with data identifying the statically defined trace point (e.g., the name of the symbol within the instrumented program that is used as a reference in the relocation table) contained within the instrumented program (106) and the corresponding location (i.e., the call-site which was patched with a no-operation) within the instrumented program (106).

Figure 2:
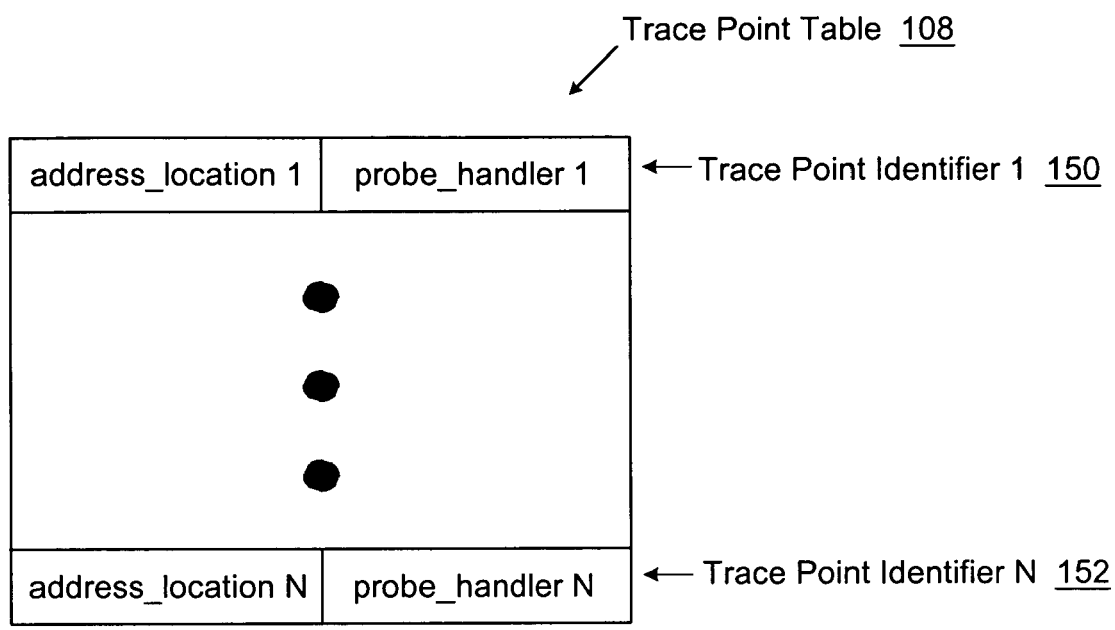
FIG. 2 shows a trace point table in accordance with an embodiment of the invention.

FIG. 2 shows a trace point table (108) in accordance with an embodiment of the present invention. The trace point table (108) includes a set of entries, each referred to in the following discussion as a trace point identifier (150, 152). In one embodiment of the invention, each trace point identifier (150, 152) includes a relocation address corresponding to the location of a particular trace point included in the instrumented program (106 in FIG. 1) and a probe handler, e.g., a tracing function name, corresponding to that trace point. Note that at the time that the trace point table (108) is populated, tracing analysis is not enabled. Thus, the system call denoted by each trace point identifier (150, 152) is represented in the instrumented program (106) using a placeholder function (not shown). In one embodiment of the invention, this trace point is patched to a no-operation instruction in the instrumented program while a probe corresponding to the trace point is disabled.

Returning to FIG. 1, once compilation is complete, the trace point table (108) is communicated to the tracing framework (110). The tracing framework (110) includes functionality for directing probe providers (112) to enable probes (not shown) at particular trace points (114, 116) within the instrumented program (106). For a particular trace point (114, 116), the specific probe to be enabled is identified in the trace point table (108 in FIG. 2) by the probe handler (150, 152 in FIG. 2).

In one embodiment of the invention, a specific probe handler takes the form of the specific tracing function name of the specific instruction (e.g., call_tracing_function_ [name of probe]) triggered in the instrumented program during execution. In one embodiment of the present invention, this functionality is possible because the probe providers (112) load into the address space of the tracing framework (110) that contains (or has access to) statically-defined trace points, and queries a run-time dynamic linker to obtain a list of trace points.

Figure 3:
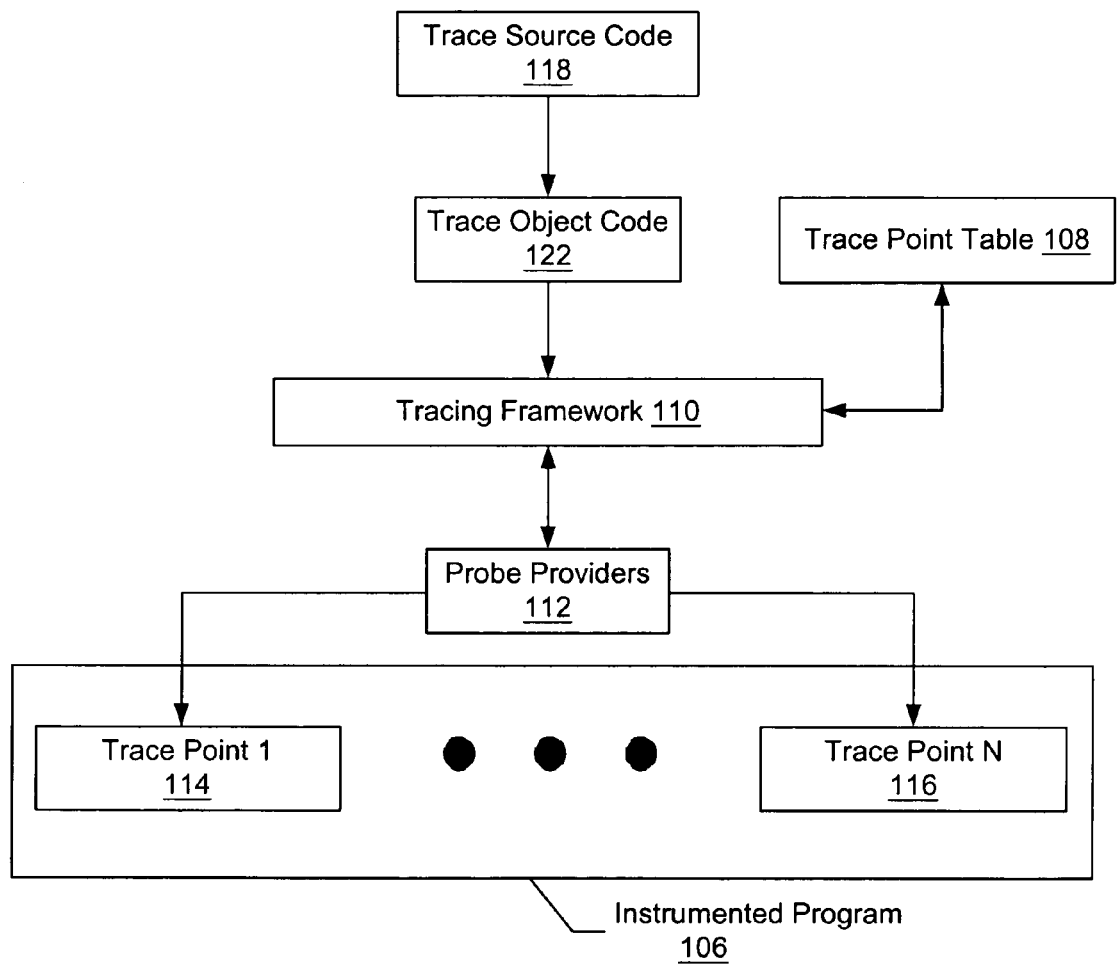
FIG. 3 shows a flow diagram of a system to perform tracing analysis in accordance with an embodiment of the invention.

FIG. 3 shows a flow diagram detailing a tracing analysis in accordance with an embodiment of the present invention. Initially, a trace source code (118) defining a particular type of analysis to be done on the software system is written, obtained, or generated. In an embodiment of the invention, trace source code (118) may be created using a standard text editor or obtained using a graphical user interface of the software system. The trace source code (118) typically includes program instructions sending requests to the tracing framework (110) to obtain information or specified data about the instrumented program (106).

Once the trace source code (118) is written, obtained, or generated, it is compiled to generate an executable trace object code (122). The trace object code (122) is then communicated to the tracing framework (110), which includes functionality for executing the trace object code (122) in order to perform the tracing analysis of the software system.

In particular, the tracing framework (110) executes the trace object code (122) by accessing information referenced by one or more of the trace point identifiers (150, 152 in FIG. 2) stored in the trace point table (108). Specifically, the tracing framework (110) interprets the trace object code (122) in order to identify address locations of trace points. The address locations are used to identify the relevant trace point identifier(s) (150, 152 in FIG. 2). Based on the probe handler(s) referenced by the relevant trace point identifier(s) (150, 152 in FIG. 2), the tracing framework (110) provides functionality to enable the relevant probes (114, 116) within the instrumented program (106). This functionality is described in detail while discussing FIG. 5 below. Upon execution of the instrumented program (106), the enabled probes (at particular trace points (114, 116) in instrumented program (106)) gather specified data, as defined by a tracing function.

Figure 4:
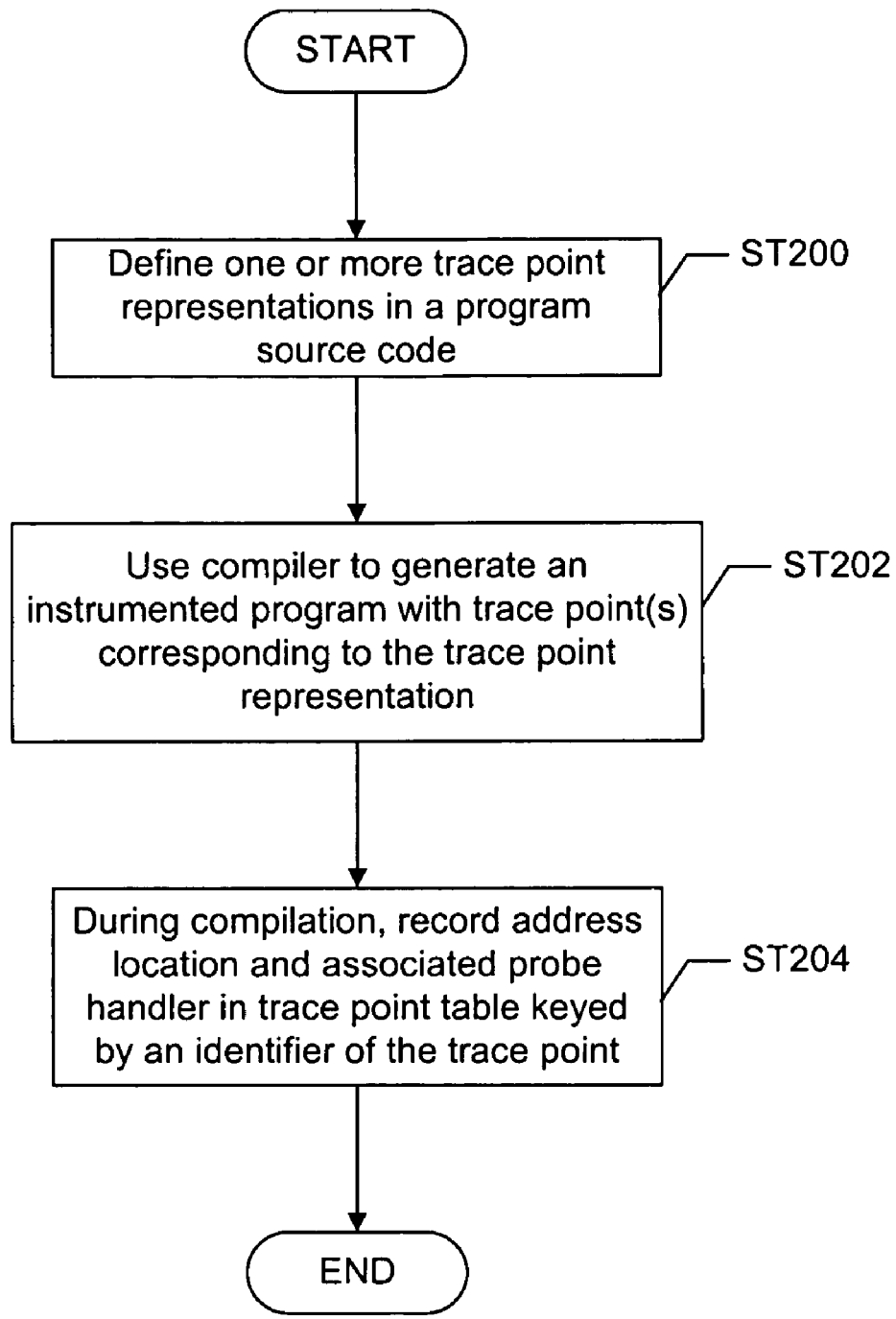
FIG. 4 shows a flowchart for defining a trace point in an instrumented program in accordance with an embodiment of the invention.

FIG. 4 shows a flowchart for defining a trace point in an instrumented program in accordance with an embodiment of the present invention. Initially, one or more trace point representations are defined in a program source code (Step 200). The trace point representation(s) may take the form of codes as shown in Code Sample 3. The program source code is compiled to generate an instrumented program with one or more trace point(s) corresponding to the trace point representation(s) (Step 202). During compilation, a trace point table is populated by recording an address location and an associated probe handler, both referenced by an identifier of the trace point (Step 204).

Figure 5:
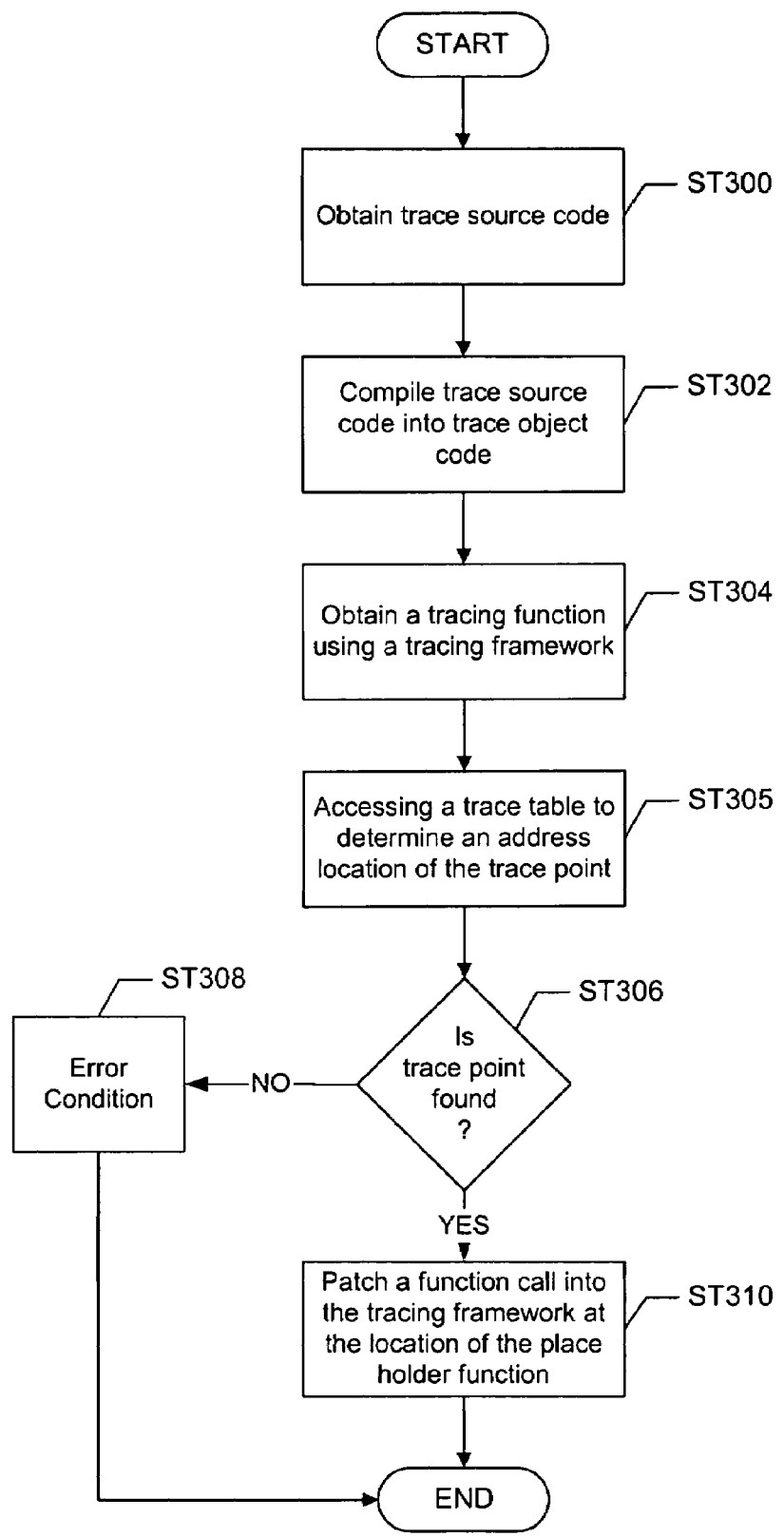
FIG. 5 shows a flowchart for enabling a probe at a trace point in an instrumented program in accordance with an embodiment of the invention.

FIG. 5 shows a flowchart for enabling a probe at a trace point in an instrumented program in accordance with an embodiment of the invention. Initially, trace source code (i.e., source code including on or more requests specified by a consumer) is obtained (Step 300). The trace source code is subsequently compiled into trace object code (Step 302). The trace object code is then loaded into the tracing framework, where it is interpreted to obtain one or more tracing functions (Step 304). The tracing function(s) provide the tracing framework information necessary to enable one or more probes (represented as trace points within the instrumented program). The information contained within the tracing function is used in conjunction with a trace table to determine an address location of the trace point in the instrumented program (Step 305).

If a trace point (or more specifically an address location of the trace point) corresponding to the information in the tracing function is not found in the tracing table (Step 306), then the tracing framework enters an error condition (Step 308). Alternatively, if a trace point corresponding to the information in the tracing function is found in the trace point table (Step 306), then the placeholder function currently stored at the address location of the trace point is patched to a function call into the tracing framework (Step 310). In one embodiment of the invention, the function call is a call into a trampoline function (i.e., a jump instruction to the tracing framework).

While the method and system described applies to virtually any computer architecture, the details of implementation depend on the specifics of a particular instruction set architecture. Embodiments of the invention as they relate to Reduced Instruction Set Computer (RISC) architectures and Complex Instruction Set Computer (CISC) architectures are described below.

An example of a RISC architecture is SPARC® architecture. SPARC® is a registered trademark of SPARC International, Inc. An example of CISC architecture is the IA-32 Intel® architecture. Intel® is a registered trademark of the Intel Corporation. Those skilled in the art will appreciate that the aforementioned examples of CISC and RISC architecture are merely included for illustrative purposes and are not intended to limit the specification.

In one or more embodiments of the invention, all instructions within a system designed on RISC architecture are of uniform length. Accordingly, enabling a trace point on such a system involves atomically switching a no-operation instruction (acting as a placeholder function) to a call into a trampoline function (i.e., a jump instruction to the tracing framework).

In one or more embodiments of the invention, call instructions on a system designed on CISC architecture are not of uniform length. More specifically, a given call instruction may be several instructions longer than a no-operation. Thus, several no-operations are patched to the trace point. Thus, to enable the trace point, the several no-operations are switched to be a call into the trampoline. Alternatively, enabling a trace point on a CISC architecture may involve patching a first no-operation instruction to an INT 3 instruction. When the INT 3 instruction is encountered during execution of the instrumented program, an INT 3 trap is generated and control is transferred to a trap handler. Next, the tracing framework is called from the INT 3 trap handler. Upon return from the tracing framework, the patched-over instruction is emulated. In this case, the patched-over instruction is a no-operation instruction. To emulate the no-operation instruction, the saved instruction pointer is incremented by 1 prior to issuing a return from trap instruction (IRET).

In one embodiment of the invention, a #LOCK instruction prefix may be used in place of the INT 3 instruction. Patching the first no-operation instruction to be the #LOCK instruction prefix generates the instruction "#LOCK nop," which is defined to be an invalid opcode by one or more 32-bit architectures. In this scheme, the processing that is described above with respect to the INT 3 trap handler is performed in the illegal opcode handler.

Figure 6:
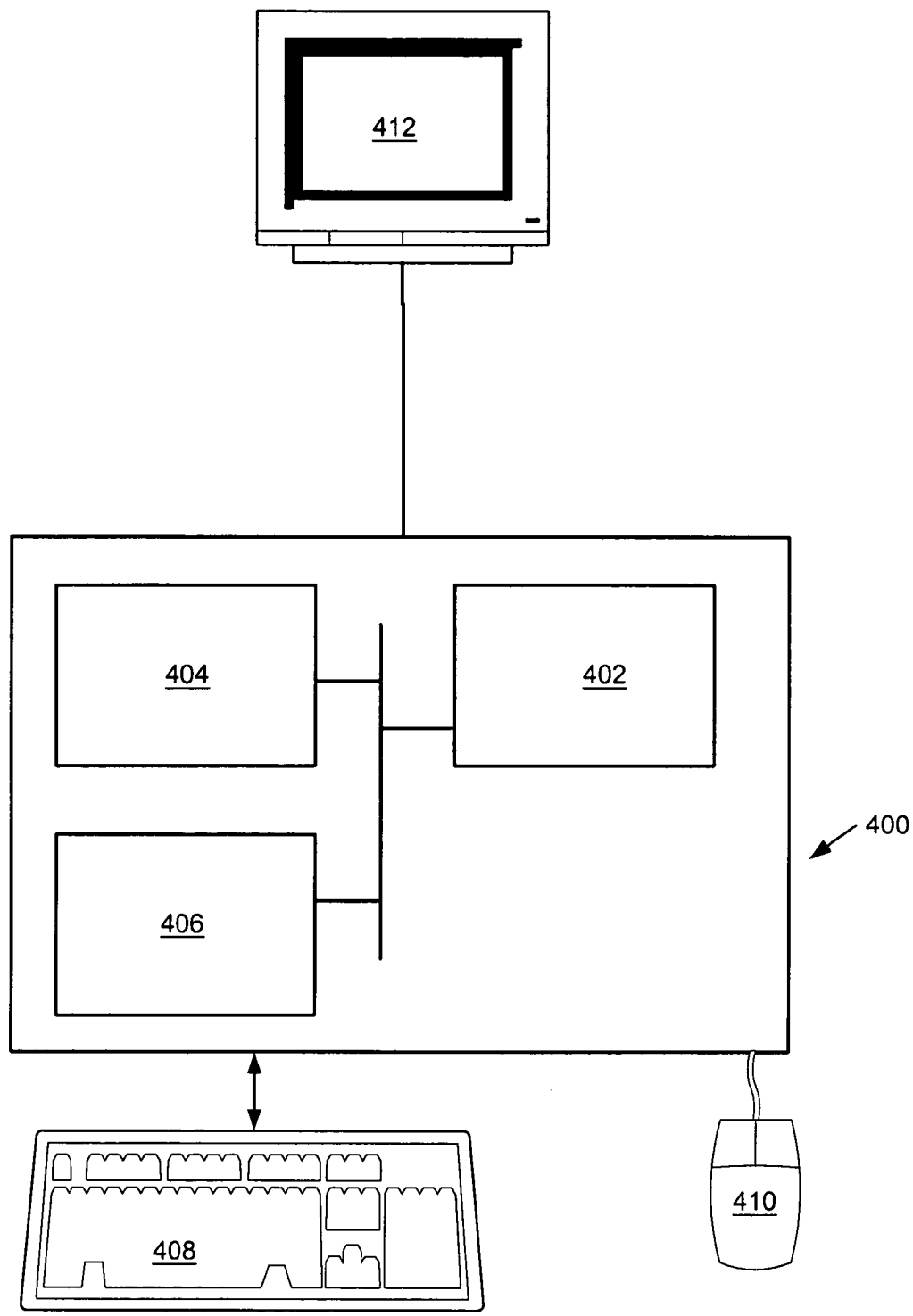
FIG. 6 shows a networked computer system in accordance with one embodiment of the invention.

The invention may be implemented on virtually any type of computer regardless of the platform being used. For example, as shown in FIG. 6, a typical networked computer system (400) includes a processor (402), associated memory (404), a storage device (406), and numerous other elements and functionalities typical of today's computers (not shown). The networked computer (400) may also include input means, such as a keyboard (408) and a mouse (410), and output means, such as a monitor (412). The networked computer system (400) is connected to a local area network (LAN) or a wide area network (e.g., the Internet) via a network interface connection (not shown). Those skilled in the art will appreciate that these input and output means may take other forms. Those skilled in the art will appreciate that one or more elements of the aforementioned computer (400) may be located at a remote location and connected to the other elements over a network.

The present invention provides a mechanism for dynamically modifying a trace point. Accordingly, a source code for a software system may be modified such that, when tracing is not enabled, or during normal operation, probe calls at statically defined trace points use minimal system resources. Specifically, even in a system that includes only tens of probes, a 2-5 percent decrease in normal, or tracing-disabled, system performance may be avoided. In a system that includes hundreds or thousands of probes, a greater than 10 percent decrease in normal system performance may be avoided.

Further, the present invention provides a modified code for use at a trace point. For a trace point using the modified code, a single instruction is generated during compilation. Accordingly, while tracing is not enabled, or during normal operation, the trace point may be emulated using a single placeholder function, thereby minimizing a number of system resources required to process the trace point.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of defining a trace point, comprising:
    defining a trace point representation in a program source code;
    compiling the program source code to generate an instrumented program comprising the trace point corresponding to the trace point representation, wherein the instrumented program is configured to execute a placeholder function at the trace point; and
    associating the trace point with the placeholder function configured to produce a minimal disabled probe effect, wherein the placeholder function is configured to be patched to the trace point representation during the compilation of the program source code if tracing analysis is enabled.

2. The method of claim 1, further comprising:
    storing an address location of the trace point and a probe handler associated with the address location in a trace point table, wherein the address location and the probe handler are identified by a trace point identifier.

3. The method of claim 2, further comprising:
    obtaining the address location of the trace point; and
    identifying the probe handler associated with the address location.

4. The method of claim 1, wherein the trace point representation comprises a tracing function defined by a code.

5. The method of claim 1, wherein the placeholder function comprises at least one instruction designed to use minimal system resources.

6. The method of claim 5, wherein at least one instruction comprises a no-operation instruction.

7. The method of claim 5, wherein the at least one instruction comprises a first instruction comprising a trap instruction and a second instruction comprising a no-operation instruction.

8. The method of claim 2, further comprising:
    obtaining a tracing function name from trace object code using a tracing framework;
    determining an address location of the trace point in the instrumented program by accessing the trace function name in the trace point table; and
    replacing a placeholder function located at the address location of trace point with a function call into the tracing framework.

9. A method for enabling a trace point, comprising:
    obtaining a tracing function name from trace object code using a tracing framework, wherein the tracing function name comprises a probe handler;
    determining an address location of the trace point in an instrumented program by accessing the probe handler in a trace point table, wherein the instrumented program is configured to execute a placeholder function at the trace point; and
    replacing the placeholder function located at the address location of the trace point with a function call into the tracing framework during the compilation of the instrumented program.

10. The method of claim 9, further comprising:
    disabling the trace point by replacing the function call with the placeholder function.

11. The method of claim 9, further comprising:
    storing the probe handler and the address location in a trace point table, wherein the trace function name and address location are identified by a trace point identifier.

12. The method of claim 9, further comprising:
    accessing a probe provider using the tracing framework; and
    directing the probe provider to enable a probe associated with the trace point.

13. The method of claim 9, further comprising:
    generating the trace point table during compilation of a program source code.

14. The method of claim 9, wherein the function call comprises calling to a jump instruction to the tracing framework.

15. The method of claim 9, wherein the function call comprises:
    generating a trap transferring control to a trap handler associated with the trap;
    calling the tracing framework from the trap handler; and
    emulating a patched-over instruction.

16. The method of claim 15, wherein the emulating comprises incrementing a saved instruction pointer by one prior to issuing a return instruction from the trap.

17. The method of claim 9, wherein the placeholder function comprises at least one instruction designed to use minimal system resources.

18. The method of claim 17, wherein the at least one instruction comprises a no-operation instruction.

19. The method of claim 17, wherein the at least one instruction comprising a first instruction comprises a trap instruction and a second instruction comprising a no-operation instruction.

20. A computer system on a network for defining a trace point comprising:
    a processor;
    a memory;
    a storage device; and
    software instructions stored in the memory for enabling the computer system to:
        define a trace point representation in a program source code;

compile the program source code to generate an instrumented program comprising the trace point corresponding to the trace point representation, wherein the instrumented program is configured to execute a placeholder function at the trace point; and wherein the trace point is associated with the placeholder function configured to produce a minimal disabled probe effect, wherein the placeholder function is configured to be patched to the trace point representation during the compilation of the program source code if tracing analysis is enabled.

21. The computer system of claim 20, further comprising software instructions stored in the memory for enabling the computer system to:

store an address location of the trace point and a probe handler associated with the address location in a trace point table, wherein the address location and the probe handler are identified by a trace point identifier.

22. The computer system of claim 21, further comprising software instructions stored in the memory for enabling the computer system to:

obtain a tracing function name from trace object code using a tracing framework;

determine an address location of the trace point in the instrumented program by accessing the trace function name in the trace point table; and replace a placeholder function located at the address location of trace point with a function call into the tracing framework.

23. The computer system of claim 20, further comprising software instructions stored in the memory for enabling the computer system to:

obtain the address location of the trace point; and identify the probe handler associated with the address location.

24. The computer system of claim 20, wherein the trace point representation comprises a tracing function defined by a code.

25. The computer system of claim 20, wherein the placeholder function comprises at least one instruction designed to use minimal system resources.

26. The computer system of claim 25, wherein the at least one instruction comprises a no-operation instruction.

27. The computer system of claim 25, wherein the at least one instruction comprises a first instruction comprising a trap instruction and a second instruction comprising a no-operation instruction.

28. A computer system on a network for enabling a trace point comprising:

a processor;
a memory;
a storage device; and
software instructions stored in the memory for enabling the computer system to:

obtain a tracing function name from trace object code using a tracing framework, wherein the tracing function name comprises a probe handler;

determine an address location of the trace point in an instrumented program by accessing the probe handler in a trace point table, wherein the instrumented program is configured to execute a placeholder function at the trace point; and replace the placeholder function located at the address location of the trace point with a function call into the tracing framework during the compilation of the instrumented program.

29. The computer system of claim 28, further comprising software instructions stored in the memory for enabling the computer system to:

disable the trace point by replacing the function call with the placeholder function.

30. The computer system of claim 28, further comprising software instructions stored in the memory for enabling the computer system to:

store the probe handler and the address location in a trace point table, wherein the trace function name and address location are identified by a trace point identifier.

31. The computer system of claim 28, further comprising software instructions stored in the memory for enabling the computer system to:

access a probe provider using the tracing framework; and direct the probe provider to enable a probe associated with the trace point.

32. The computer system of claim 28, further comprising software instructions stored in the memory for enabling the computer system to:

generate the trace point table during compilation of a program source code.

33. The computer system of claim 28, wherein the function call comprises calling to a jump instruction to the tracing framework.

34. The computer system of claim 28, wherein the function call comprises:

generating a trap transferring control to a trap handler associated with the trap;

calling the tracing framework from the trap handler; and emulating a patched-over instruction.

35. The computer system of claim 34, wherein the emulating comprises incrementing a saved instruction pointer by one prior to issuing a return instruction from the trap.

36. The computer system of claim 28, wherein the placeholder function comprises at least one instruction designed to use minimal system resources.

37. The computer system of claim 36, wherein the at least one instruction comprises a no-operation instruction.

38. The computer system of claim 36, wherein the at least one instruction comprising a first instruction comprises a trap instruction and a second instruction comprising a no-operation instruction.

* * * * *